United States Patent [19]
Smaler

[11] 3,752,925
[45] Aug. 14, 1973

[54] APPARATUS FOR HOLDING MAGNETIC TAPES IN INTIMATE CONTACT

[76] Inventor: Philip Smaler, 4155 Wilkie, Palo Alto, Calif. 94306

[22] Filed: Oct. 1, 1971

[21] Appl. No.: 185,613

[52] U.S. Cl. .............. 179/100.2 E, 226/97, 226/172
[51] Int. Cl.... G11b 5/86, G11b 15/43, G11b 15/38
[58] Field of Search .............. 179/100.2 E, 100.2 R; 226/108, 172, 97; 274/4 D, 11 D, 11 F

[56] References Cited

UNITED STATES PATENTS

| | | | |
|---|---|---|---|
| 3,544,732 | 12/1970 | Bauer | 179/100.2 E |
| 3,515,328 | 6/1970 | Smith | 226/172 |
| 3,632,898 | 1/1972 | Slade et al. | 179/100.2 E |

*Primary Examiner*—Bernard Konick
*Assistant Examiner*—Robert S. Tupper
*Attorney*—Charles M. Hogan

[57] ABSTRACT

A pair of endless flexible belts are trained over guide rollers so that opposing faces of the guide belts form a squeeze passage for master and copy magnetic tapes. Plates extending along edges of the belts form chambers in combination with them. The chambers are pressurized to expand the belts against one another and hold the tapes in intimate non-slipping contact with a substantial uniform force. A magnetic head positioned in one of the pressure chambers biases the copy tape to enable a direct contact transfer recording of magnetic signals from the master to the copy tape.

9 Claims, 1 Drawing Figure

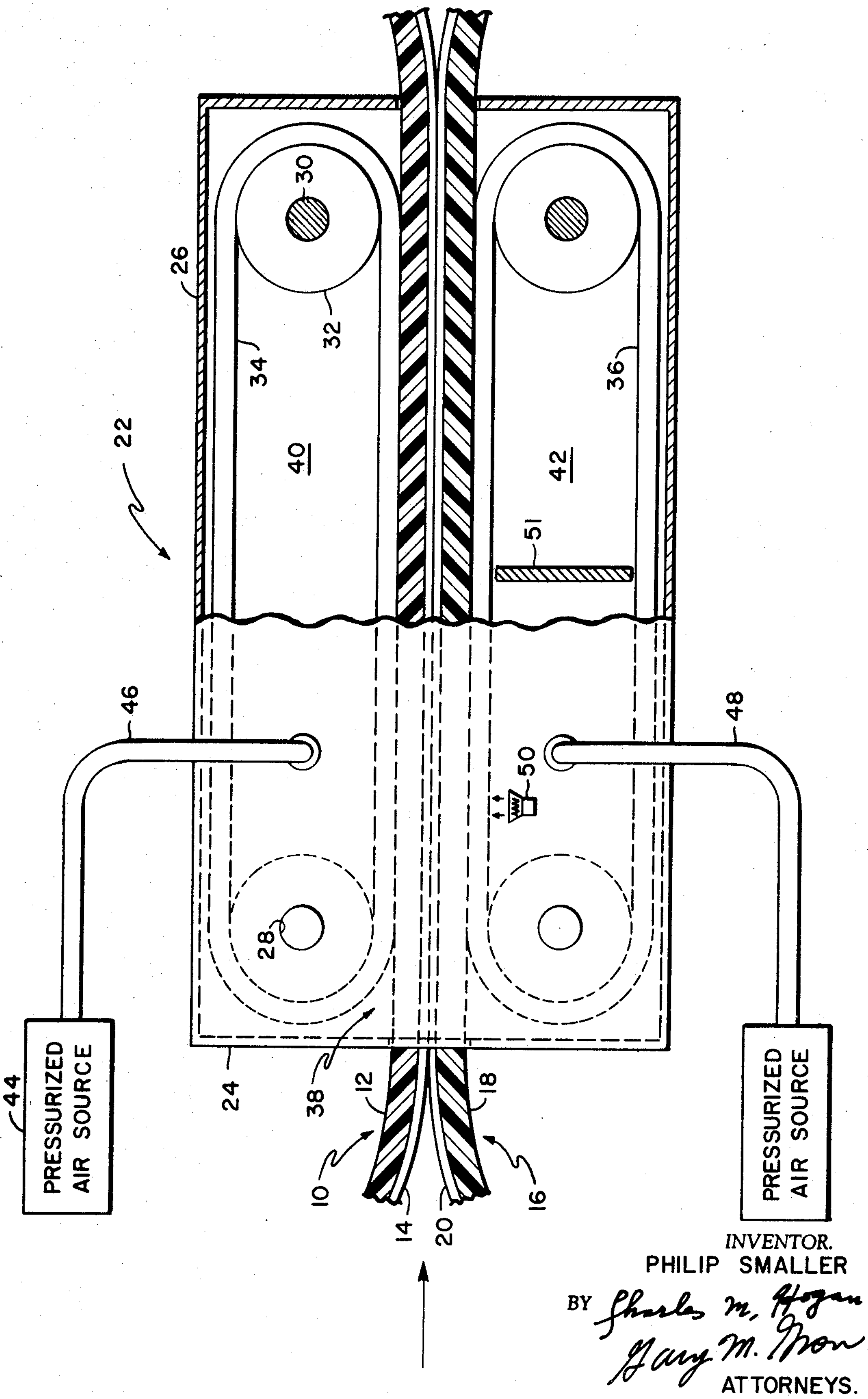
INVENTOR.
PHILIP SMALLER
BY Charles M. Hogan
Gary M. Moon
ATTORNEYS.

APPARATUS FOR HOLDING MAGNETIC TAPES IN INTIMATE CONTACT

The present invention relates to transfer of magnetic signals and more specifically to direct contact magnetic transfer.

In recent years the direct contact transfer method has been used to transfer magnetic signals from a master to a copy tape. Briefly, this method involves the placing of a master and a copy tape in intimate contact while the sensitivity of the copy tape to the magnetic signals on the master tape is increased. The increased sensitivity may be provided by a magnetic bias where the master has a higher coercivity than the copy tape. Another method involves placing a copy tape with a relatively low Curie point in a paramagnetic state during contact.

Both of these methods demand that the master and copy tapes be held in intimate contact and that there be slippage-free movement. The reason for this is that the magnetic field from the master tape drops off rapidly for relatively small distances away from the tape and a loose contact or slippage greatly impairs the ability of the master tape signal to magnetize the copy tape. In the past, tapes have been held in contact by opposed rollers. However, this approach provides only a small area where the tapes are held with a uniform force and introduces slippage. In addition, wear of the means for journaling the rollers causes a variation in the force level that must be compensated for.

Therefore it is an object of the present invention to reliably and effectively hold a plurality of magnetic tapes in intimate and uniform slippage-free contact.

These ends are achieved by a pair of adjacent endless movable flexible belts positioned so that their opposed outer faces define a squeeze passage for a plurality of tape elements. A chamber is formed in combination with the interior sides of the opposed outer faces of the belts. Pressurization of the chamber urges the belts against one another to hold the tapes in intimate contact.

The above and other related objects and features of the present invention will be apparent from a reading of the description of the disclosure shown in the accompanying drawing and the novelty thereof pointed out in the appended claims.

The single FIGURE illustrates a tape guide apparatus embodying the present invention.

In the FIGURE there is shown a master tape 10 comprising a flexible backing 12, such as a polyester film, and a relatively thin ferromagnetic layer 14. A copy tape 16 comprising a flexible backing 18 and a ferromagnetic layer 20 is positioned so that the ferromagnetic layers 14 and 20 can be placed in intimate contact in a guide apparatus, generally referred to by reference character 22. The tapes 10, 16 are unreeled from a supply reel through the guide apparatus 22 to a take-up reel (both of which are not shown). The guide apparatus 22 comprises a pair of opposed plates 24 and 26 having aligned openings 28 in which shafts 30 of guide rollers 32 are journaled. A pair of endless flexible belts 34 and 36 of suitable material are trained over the guide rollers 32. The guide rollers 32 are generally parallel to one another and are positioned so that the opposed outer face portions of the belts 34 and 36 define a squeeze space, generally indicated by reference character 38, for tapes 10 and 16.

Endless belts 34 and 36 each have a sufficient width so that they sealingly engage side plates 24 and 26 to form chambers 40 and 42. These chambers are supplied with pressurized air from pressurized air sources 44 via conduits 46 and 48, respectively.

During operation, the tapes 10 and 16 are pulled through the squeeze space 38 by their respective take-up reels. The pressurized air source delivers pressurized air to chambers 40 and 42. Since the side plates 24 are relatively rigid the flexible belts 34 and 36 expand outward. Over the portion where the belts oppose one another, their outer faces expand against one another and provide a highly effective compressive force on tapes 10 and 16. This causes the belts to be driven around the pulleys by the movement of tapes 10, 16. It should be apparent that the belts may also be driven to assist the movement of tapes 10 and 16. During the contact period the copy tape 16 is sensitized to the magnetic signals on master tape 10 by a suitable process so that an effective transfer of the magnetic signals can take place. When copy tape 16 is formed from a low Curie point material it is heated by heating element 50 to a paramagnetic state in the inlet portion of the guide apparatus 22 and allowed to cool to a ferromagnetic state before leaving the apparatus. An insulating barrier 51 may be provided to separate the inlet and outlet portions of the chamber into heating and cooling regions, respectively. If further cooling is desired a suitable cooling medium may be introduced into the outlet portion. Another arrangement is where the master tape 10 has a higher coercivity than the copy tape 16 and the copy tape is sensitized by a magnetic bias.

It should be noted that there is a substantial contact area in between guide rollers 32 to eliminate any relative slippage between tapes 10 and 16. For the arrangement which uses a thermal bias, belts 34 and 36 may be selected from material having a predetermined slightly greater coefficient of thermal expansion in the transverse direction. This causes a slight transverse tension to be placed on the tapes, thus minimizing physical distortion due to transverse shrinkage in the tapes. In addition, the fluid pressure in chambers 40 and 42 acts on belts 34 and 36 to provide a uniform force holding the tapes in intimate contact. This uniform force is dependent on the pressure levels in the chambers and is affected very little by wear of the parts.

Another advantage of this scheme is that the tapes are under no tension while they are pressed into contact. This is important in the case of thermal transfer where the tapes are heated and lose their mechanical strength. In addition, the amount of shrinkage which the tapes exhibit when they are heated to an elevated temperature is reduced. This shrinkage is characteristic of many plastics. By holding the tapes rigidly during the period that they are heated and cooled, the shrinkage is minimized. Shrinkage in the transverse and longitudinal directions are both reduced. Transverse shrinkage is particularly harmful since it affects the ability to guide the tapes accurately.

While a preferred embodiment of the present invention has been described, it should be apparent to those skilled in the art that other forms may be utilized without departing from the spirit and scope of the present invention.

Having thus described the invention, what is novel and desired to be secured by Letters Patent of the United States is:

1. Apparatus for holding a plurality of moving magnetic tapes in contact, said apparatus comprising:

a pair of adjacent endless flexible belts;

first and second sets of generally parallel guide rollers journaled for rotation so that longitudinal tension in the tapes is minimized;

said belts being trained over said guide rollers and said guide rollers positioned so that opposed outer faces of said belts define a squeeze passage for said plurality of tapes as the belts travel around said guides;

means for forming a pressure chamber in combination with the interior sides of said belts traveling between said guide rollers so that pressurization of said chamber urges the opposing outer faces of said belts against one another.

2. Apparatus as in claim 1 further comprising a means positioned in one of said pressure chambers for sensitizing one of the tapes to the signals on the other tape when they are in contact with one another.

3. Apparatus as in claim 2 wherein one of said tapes has a relatively low Curie point and said sensitizing means comprises a means for heating said tape to a paramagnetic state whereby it is magnetized by the signals on the other tape.

4. Apparatus as in claim 3 wherein said heating means is in the inlet portion of said apparatus and said apparatus further comprises a cooling region in the outlet portion of said apparatus whereby the tapes are cooled before leaving the belts.

5. Apparatus as in claim 3 wherein said belts are comprised of a material with a temperature coefficient of expansion greater than that of the tapes so that the tapes are held under slight tension in the transverse direction to minimize shrinkage in this direction.

6. Apparatus as in claim 1 wherein said pressure chamber means comprises plates sealingly engaging the side edges of said belts for forming a chamber and conduit means extending to said plate for supplying said chamber with a source of pressurized air.

7. Apparatus as in claim 6 wherein said plates are unitary plates on opposite sides of the belts and forming a pressure chamber with both of said belts and said conduit means comprises a pair of conduits each connected to said plate in line with one of said chambers.

8. Apparatus as in claim 7 wherein said guide rollers are journaled in said plates.

9. Apparatus for holding a plurality of moving magnetic tapes in contact, said apparatus comprising:

a pair of adjacent endless flexible belts;

first and second sets of generally parallel guide rollers journaled for free rotation;

said belts being trained over said guide rollers and said guide rollers positioned so that opposed outer faces of said belts define a squeeze passage for said plurality of tapes as the belts travel around said guides;

means for forming a pressure chamber in combination with the interior sides of said belts traveling between said guide rollers so that pressurization of said chamber urges the opposing outer faces of said belts against one another.

* * * * *